(12) United States Patent
Petraitis et al.

(10) Patent No.: US 8,502,147 B2
(45) Date of Patent: Aug. 6, 2013

(54) MICROBOLOMETER DETECTOR LAYER

(75) Inventors: Yaroslava Petraitis, Ventura, CA (US); Richard E. Bornfreund, Santa Barbara, CA (US); Joseph H. Durham, Santa Barbara, CA (US); Robert F. Cannata, Santa Barbara, CA (US)

(73) Assignee: Flir Systems, Inc., Wilsonville, OR (US)

( * ) Notice: Subject to any disclaimer, the term of this patent is extended or adjusted under 35 U.S.C. 154(b) by 23 days.

(21) Appl. No.: 13/252,948

(22) Filed: Oct. 4, 2011

(65) Prior Publication Data

US 2013/0082178 A1 Apr. 4, 2013

(51) Int. Cl.
*H01L 25/00* (2006.01)

(52) U.S. Cl.
USPC ........................................ 250/332

(58) Field of Classification Search
USPC .............. 250/330–335, 336.1–336.2, 337, 250/338.1–338.5, 339.1–339.15, 340, 341.1–341.9, 250/342–353
See application file for complete search history.

(56) References Cited

U.S. PATENT DOCUMENTS

| | | | | |
|---|---|---|---|---|
| 3,484,611 A | * | 12/1969 | Hisao | .......................... 250/351 |
| 5,021,663 A | * | 6/1991 | Hornbeck | ..................... 250/349 |
| 5,801,383 A | | 9/1998 | Wada et al. | |
| 6,028,309 A | | 2/2000 | Parrish et al. | |
| RE36,706 E | | 5/2000 | Cole | |
| 6,222,454 B1 | * | 4/2001 | Harling et al. | ................. 340/584 |
| 6,489,613 B1 | | 12/2002 | Mori et al. | |
| 7,250,604 B2 | | 7/2007 | Moon et al. | |
| 7,915,585 B2 | * | 3/2011 | Geneczko | .................. 250/338.1 |
| 2007/0120058 A1 | * | 5/2007 | Blackwell et al. | ......... 250/338.1 |

FOREIGN PATENT DOCUMENTS

| | | |
|---|---|---|
| EP | 0156008 | 10/1985 |
| EP | 1122526 | 8/2001 |
| JP | 8128889 | 5/1996 |
| JP | 9257565 | 10/1997 |
| KR | 20050077899 | 8/2005 |

OTHER PUBLICATIONS

Gouda et al., "Structural and electrical properties of mixed oxides of manganese and vanadium: A new semicondcutor oxide thermister material," 2009, Sensors and Actuators A, vol. 155, pp. 263-271.*
Nam et al., Structural and electrical properties of vanadium tungsten oxide thin films Grown on Pt/TiO$_2$/SiO$_2$/Si substrates, Journal of Ceramic Processing Research, vol. 10, No. 2, 2009, pp. 224-226.
Nam et al., Structural and Electrical Properties of Vanadium Tungsten Oxide Thin films, The International Conference on Electrical Engineering, 2009, pp. 1-4.

(Continued)

*Primary Examiner* — Kiho Kim
(74) *Attorney, Agent, or Firm* — Haynes and Boone, LLP

(57) ABSTRACT

A microbolometer is disclosed, including a bottom dielectric of a bridge structure; a detector layer disposed above the bottom dielectric, the detector layer comprised of a metal-doped vanadium pentaoxide material; and a top dielectric disposed above the detector layer.

23 Claims, 11 Drawing Sheets

(56) References Cited

OTHER PUBLICATIONS

Nam et al., Electrical properties of vanadium tungsten oxide thin films, Elsevier, Material Research Bulletin, 45, 2010, pp. 291-294.

Batista, C., et al., "Structural and Morphological Characterization of Magnetron Sputtered Nanocrystalline Vanadium Oxide Films for Thermochromic Smart Surfaces", Journal of Nano Research, 2008, pp. 21-30, v. 2, Trans Tech Publications, Switzerland.

Sung-Pill Nam et al, "Electrical properties of vanadium tungsten oxide thin films", Materials Research Bulletin, Mar. 1, 2010, 291-294, vol. 45, No. 3, Elsevier, Kidlington, GB.

\* cited by examiner

US 8,502,147 B2

MICROBOLOMETER DETECTOR LAYER

TECHNICAL FIELD

The present disclosure relates generally to infrared cameras, and, more particularly, to microbolometer detectors and focal plane arrays.

BACKGROUND

During the 1880's, an infrared detector called the bolometer was developed. The bolometer operates on the principle that the electrical resistance of the bolometer material changes with respect to the bolometer temperature, which in turn changes in response to the quantity of absorbed incident infrared radiation. These characteristics can be exploited to measure incident infrared radiation on the bolometer by sensing the resulting change in its resistance. When used as an infrared detector, the bolometer is generally thermally isolated from its supporting substrate or surroundings to allow the absorbed incident infrared radiation to generate a temperature change in the bolometer material.

Microbolometer arrays are typically fabricated on monolithic silicon substrates or integrated circuits by constructing two-dimensional arrays of closely spaced air bridge structures coated with a temperature sensitive resistive material that absorbs infrared radiation. The air bridge structure provides thermal isolation between the microbolometer detector and the silicon substrate.

With each microbolometer functioning as a pixel within the array, a two-dimensional image or picture representation of the incident radiation can be generated by translating the changes in resistance of each microbolometer into a time-multiplexed electrical signal that can be displayed on a monitor or stored in a memory. The circuitry used to perform this translation is commonly known as the read out integrated circuit (ROIC), and may be fabricated as an integrated circuit in the silicon substrate. The microbolometer array may then be fabricated on top of the ROIC. The combination of the ROIC and microbolometer array is commonly known as a microbolometer infrared focal plane array (FPA).

Conventional microbolometers may have various performance limitations, such as for example decreased sensitivity due to inadequate thermal isolation, a temperature coefficient of resistance (TCR) mismatch of circuit elements, a contraction of optical absorption spectra, and/or a limited spectral response range. As a result, there is a need for improved detectors and manufacturing processes that may enhance detector performance.

SUMMARY

The present disclosure provides for various advantageous microbolometers, focal plane arrays, and methods of fabricating a microbolometer, in accordance with one or more embodiments. For example, in accordance with an embodiment, a microbolometer includes a bottom dielectric of a bridge structure; a detector layer disposed above the bottom dielectric, the detector layer comprised of a metal-doped vanadium pentaoxide material; and a top dielectric disposed above the detector layer.

In accordance with another embodiment of the present disclosure, a focal plane array includes a readout circuit (ROTC), and a plurality of microbolometers electrically coupled to the ROIC, each microbolometer including elements as those described above and herein.

In accordance with yet another embodiment of the present disclosure, a method for fabricating a microbolometer includes forming a bottom dielectric of a bridge structure; sputter depositing a detector layer above the bottom dielectric, the detector layer comprised of a metal-doped vanadium pentaoxide material; and forming a top dielectric above the detector layer.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
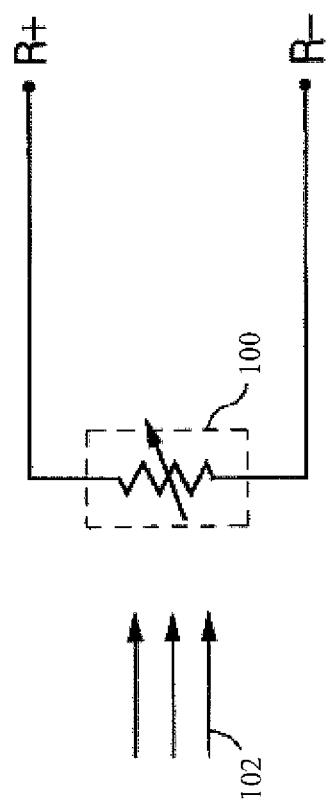
FIGS. 1A and 1B illustrate a schematic diagram and a perspective view, respectively, of a single microbolometer detector with two terminal interconnects in accordance with embodiments of the present disclosure.
Figure 1B:
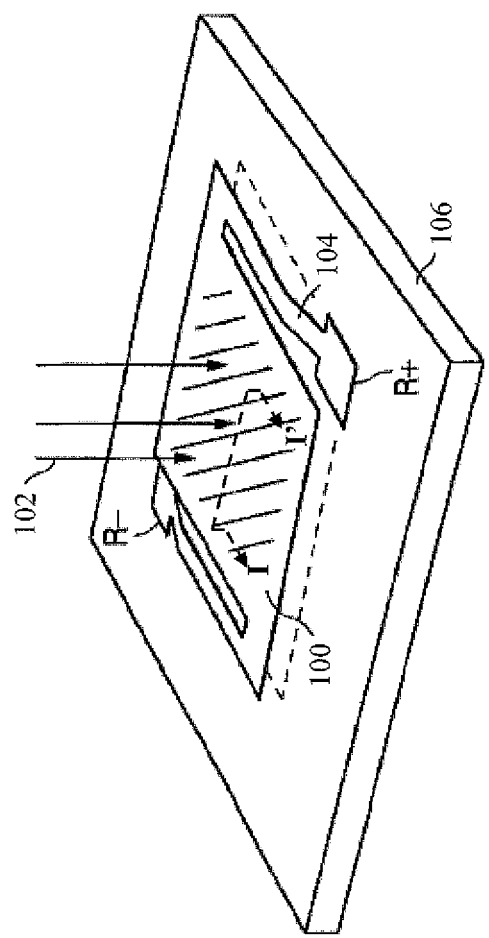

FIGS. 1A and 1B illustrate a schematic diagram and a perspective view, respectively, of a single microbolometer detector 100 with a two terminal interconnection in accordance with embodiments of the present disclosure.

Microbolometer 100 is thermally isolated from its supporting substrate or surroundings to allow the absorbed incident infrared radiation 102 to generate a temperature change in the microbolometer material. This isolation is designated by the dashed square box around the detector 100. The thermally isolated microbolometer 100 changes temperature in response to the incident radiation level, changes in the substrate temperature, and the electrical power dissipated in the detector during the measurement of the microbolometer resistance.

In systems where a single detector is employed, two conductive leads can be attached to the microbolometer material providing a means of conducting current through the microbolometer to sense its resistance. FIGS. 1A and 1B illustrate the electrical connection to the microbolometer detector. In this case, a thermally isolated microbolometer 100 is shown in the presence of incident infrared radiation 102 with two leads connecting to microbolometer terminals R+ and R−. FIG. 1B shows an example of a physical implementation of the microbolometer 100. The R+ and R− electrical connections to the microbolometer are created at the ends of legs 104 where the microbolometer comes in contact with a substrate 106.

Figure 2A:
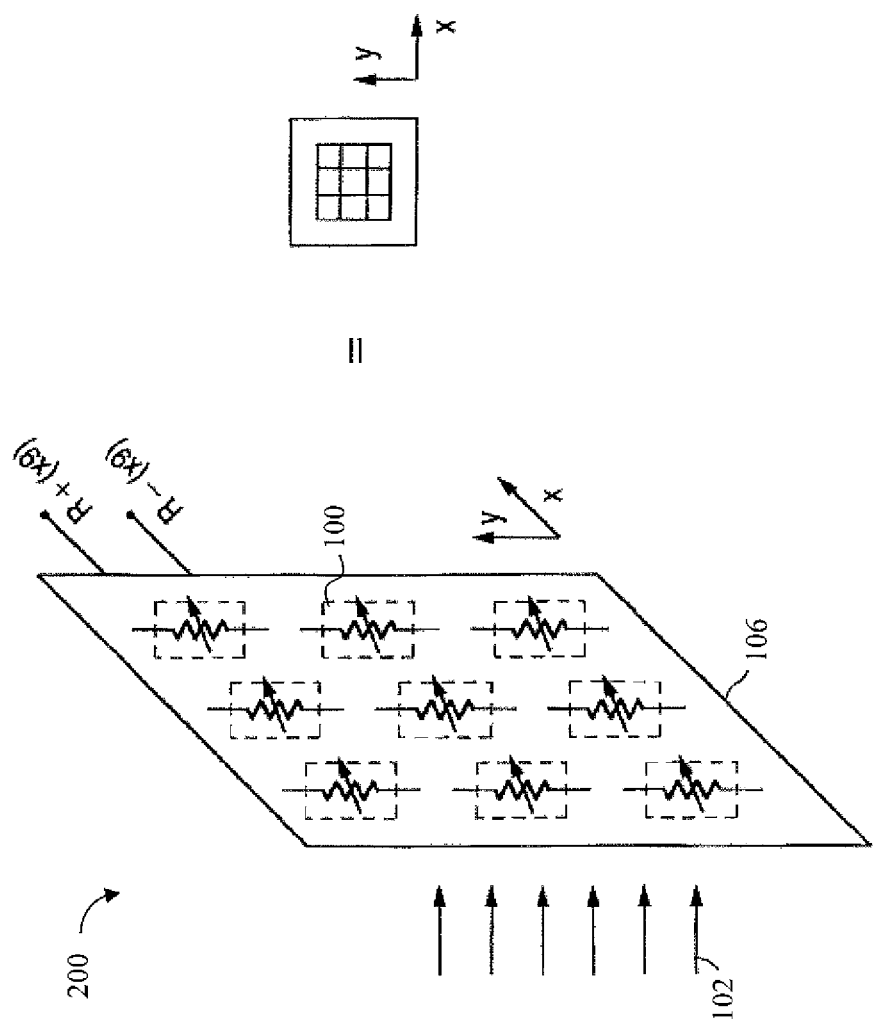
FIGS. 2A and 2B illustrate a schematic diagram and a perspective view, respectively, of a three-by-three array of two-terminal microbolometer detectors in accordance with embodiments of the present disclosure.
Figure 2B:
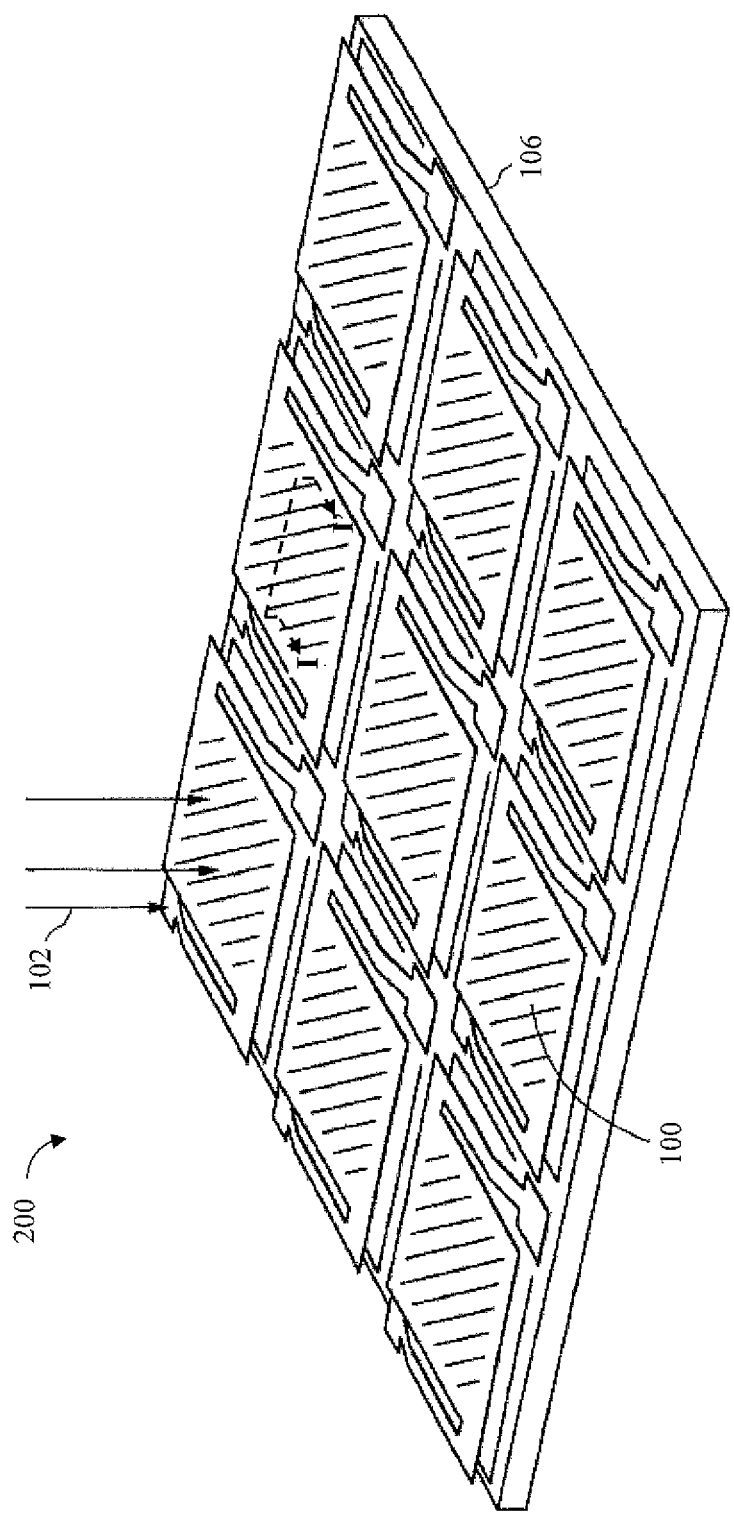

FIGS. 2A and 2B illustrate a schematic diagram and a perspective view, respectively, of a three-by-three array 200 of two-terminal microbolometer detectors 100 showing nine positive and negative interconnect terminals in accordance with embodiments of the present disclosure.

Figure 3:
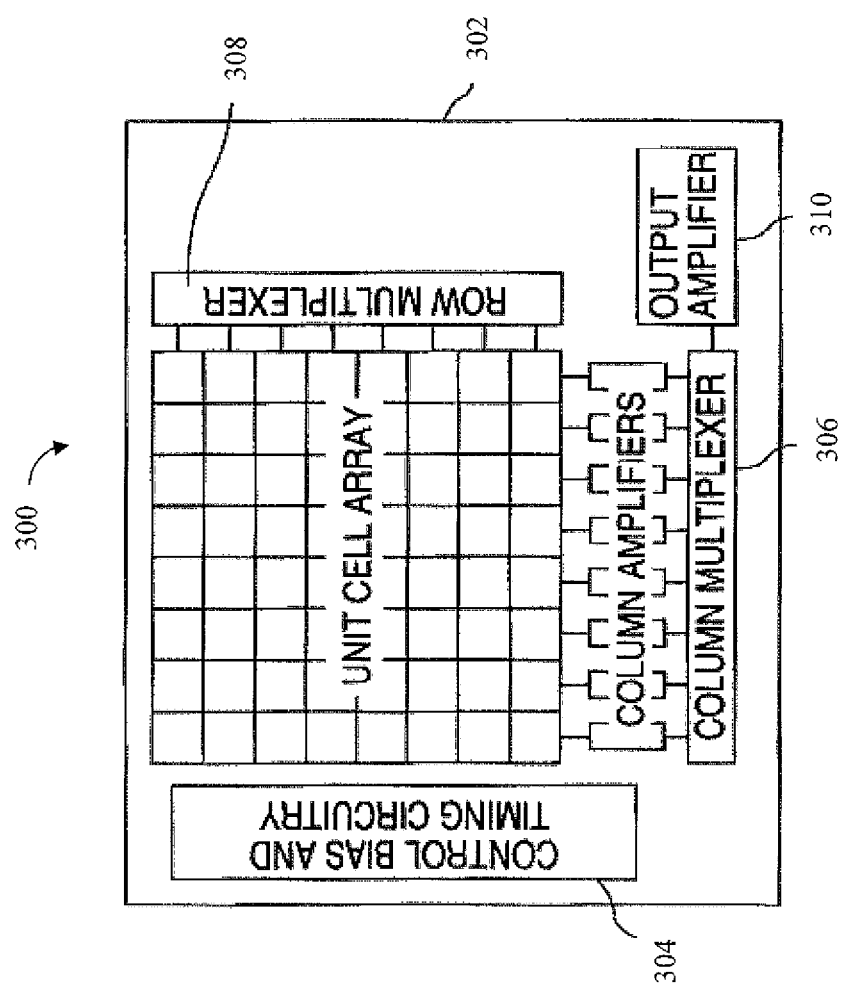
FIG. 3 illustrates an example of a read out integrated circuit (ROIC).

In cases where it is desired to sense the resistance or temperature of an array of microbolometer detectors it may become physically impractical to provide individual wire lead connections for each detector. FIGS. 2A, 2B, and 3 illustrate a method of interconnecting to a microbolometer detector array. Shown in FIGS. 2A and 2B is a three-by-three detector array 200 requiring nine positive and negative interconnects. Interconnects for the individual microbolometer detectors 100 in the array are created as part of the fabrication process, and contact the circuitry in the silicon substrate 106.

Large two-dimensional arrays of microbolometers can utilize a read out integrated circuit (ROIC) to provide the required bolometer interface, an example of which is illustrated in FIG. 3. The ROIC incorporates circuitry that is placed in spatial proximity to the detectors to perform the functions of the detector interface and multiplexing. The circuitry associated with a particular microbolometer detector may be located in the silicon substrate directly beneath the detector and may be referred to as the unit cell.

By time-multiplexing signals of the microbolometer detectors, the number of required electrical interconnect leads can be greatly reduced. To simplify the multiplexing process and system interface, the ROIC may include digital logic circuitry to generate the signals required to control row and column address switches in an array.

FIG. 3 illustrates an example ROIC for an 8×8 array of microbolometer detectors. The array of unit cells, column amplifiers, a column multiplexer 306, and a row multiplexer 308 may be integrated on to a single ROIC silicon die 302. The microbolometer array may be constructed on top of the unit cell array. The ROIC further includes bias generation and timing control circuitry 304 and an output amplifier 310. The ROIC provides critical interfaces for both the microbolometer detector array and the external system. Further descriptions of ROIC and microbolometer circuits may be found in U.S. Pat. No. 6,028,309, which is incorporated by reference in its entirety herein for all purposes.

Figure 4:
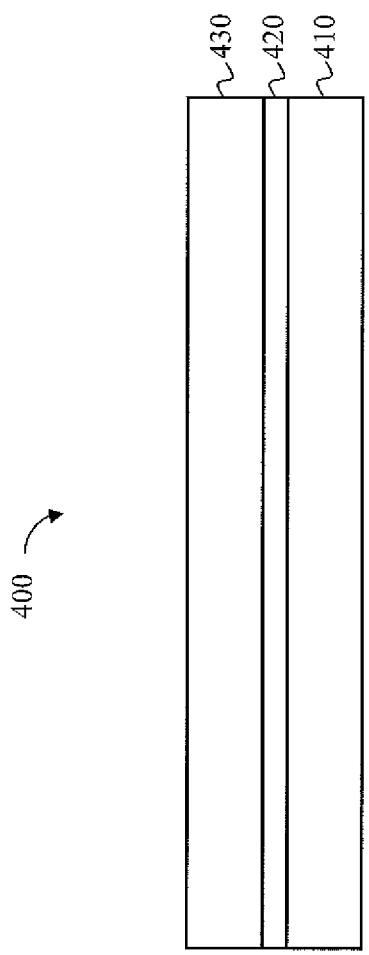
FIG. 4 illustrates a cross-sectional diagram of a microbolometer bridge with a novel detector layer in accordance with an embodiment of the present disclosure.

FIG. 4 illustrates a cross-sectional diagram of a microbolometer bridge 400 along a line I-I' in FIGS. 1B and 2B in accordance with an embodiment of the present disclosure. Microbolometer bridge 400 includes an advantageous and novel detector layer comprised of a metal-doped vanadium pentaoxide material in accordance with embodiments of the present disclosure.

According to one embodiment, microbolometer bridge 400 includes a bottom dielectric 410, a detector layer 420 disposed above the bottom dielectric 410, and a top dielectric 430 disposed above the detector layer 420.

According to one aspect of the present disclosure, each of the bottom dielectric 410 and the top dielectric 430 may include a silicon nitride layer, a silicon oxynitride layer, a silicon oxide layer, or a combination thereof. In other words, bottom dielectric 410 and top dielectric 430 may be comprised of a single dielectric layer or multiple layers of dielectric. According to another aspect, bottom dielectric 410 may have a different refractive index from top dielectric 430, or the refractive indexes may be similar. According to another aspect, bottom dielectric 410 may have a thickness between about 200 Å and about 2000 Å, and top dielectric 430 may have a thickness between about 200 Å and about 1200 Å.

The bottom and top dielectrics described above may be deposited by plasma enhanced chemical vapor deposition (PECVD) using silane ($SiH_4$), nitrogen (N2), ammonia ($NH_3$), and/or nitrous oxide ($N_2O$) precursor gases, in one example, but various other deposition methods and precursor gases may be applicable. For example, the bottom and top dielectrics may be formed using any suitable process, such as physical vapor deposition (PVD), atomic layer deposition (ALD), high density plasma CVD (HDPCVD), metal organic CVD (MOCVD), remote plasma CVD (RPCVD), plasma enhanced CVD (PECVD), other suitable methods, and/or combinations thereof, and using any suitable equipment or apparatus, such as a deposition/reaction chamber, power sources, impedance matching units, heating elements, pumps, and the like. Depending upon the desired dielectric layer composition, various reactants may be selected, such as silane, diethylsilane, ammonia, oxygen, nitrous oxide, a fluorocarbon, and/or tetraethylorthosilicate (TEOS). Dilution and/or inert gases may also be selected, such as nitrogen, argon, and/or helium. Thus, bottom and top dielectrics may be comprised of various materials and may be formed by suitable processes to have various thicknesses in accordance with the present disclosure. Further descriptions and examples of microbolometer films may be found in U.S. application Ser. No. 13/157,762, filed on Jun. 10, 2011, entitled "Multilayered Microbolometer Film Deposition", which is incorporated by reference in its entirety herein for all purposes.

Detector layer 420 is comprised of a metal-doped vanadium pentaoxide material, which may be denoted by metal$_x$: $Va_{(2-x)}O_5$, with x between about 0.1 and about 0.4 in one example. According to one aspect, the detector layer 420 may be comprised of a metal selected from the group consisting of tungsten (W), manganese (Mn), titanium (Ti), chromium (Cr), molybdenum (Mo), niobium (Nb), and zirconium (Zr). According to another aspect, the detector layer 420 may have a thickness between about 600 Å and about 1000 Å, in one example, and detector layer 420 may have a thickness of about 800 Å in another example. According to another aspect, the detector layer 420 may be comprised of $W_xVa_{(2-x)}O_5$, with x between about 0.1 and about 0.4. According to another aspect, the detector layer 420 may have a temperature coefficient of resistance of about 3.4%, and a sheet resistance of about 200 kOhms.

According to one aspect of the present disclosure, detector layer 420 may be formed by sputter deposition by reacting vanadium pentaoxide, a metal, and a sputter gas in a sputtering chamber. RF sputtering or DC pulsed sputtering may be used in one example. The metal may be selected from the group consisting of tungsten (W), manganese (Mn), titanium (Ti), chromium (Cr), molybdenum (Mo), niobium (Nb), and zirconium (Zr), and a sputter gas may be selected from the group consisting of argon (Ar), xenon (Xe), and krypton (Kr). According to another aspect, the detector layer 420 may be formed by reacting vanadium pentaoxide, tungsten, and argon sputter gas to form a $W_xVa_{(2-x)}O_5$ detector layer, wherein x is between about 0.1 and about 0.4. In one embodiment, no oxygen is used during the sputter deposition. In another embodiment, the sputter deposition may be performed at temperatures between about 100 degrees Celsius and about 200 degrees Celsius.

In one example, detector layer 420 may be deposited by RF sputtering, with power between about 100 W and about 300 W, power density of plasma of about 4.9 W/cm2 for 100 W and about 14.8 W/cm2 for 300 W, process pressure between about 5 mTorr and about 50 mTorr, and a wafer temperature from about room temperature to about 400 degrees Celsius.

In another example, detector layer 420 may be deposited by RF sputtering, with power at about 200 W, a power density of about 9.9 W/cm2, a sputter gas of argon, process pressure of about 5 mTorr, and wafer temperature of about 200 degrees Celsius.

According to yet another aspect of the present disclosure, detector layer 420 may be formed at least in part by chemical vapor deposition (CVD) or various forms of CVD, ion beam deposition, or other applicable techniques, in a reactive deposition process. In yet another aspect of the present disclosure, detector layer 420 may be formed by deposition based on a stochiometric oxide target without a reactive process.

According to yet another aspect, detector layer 420 may be formed by performing a first anneal on the deposited metal-doped vanadium pentaoxide material in a nitrogen environment, and then performing a second anneal on the first annealed metal-doped vanadium pentaoxide material in an oxygen environment. In one example, each of the first anneal and the second anneal may be performed for about 10 minutes at about 375 degrees Celsius. In another example, the first anneal may be performed in a nitrogen-rich environment for about 10 minutes at about 375 degrees Celsius, and the second anneal may be performed in an oxygen-rich environment for about 5 minutes at about 375 degrees Celsius.

Advantageously, the detector layer 420 of the present disclosure is stable during additional processing post formation of the detector layer, such as during additional anneals, etch steps, patterning, and the like.

The present disclosure also provides for an advantageous focal plane array (FPA), comprising a readout circuit (ROIC), and a plurality of microbolometers electrically coupled to the ROIC, each microbolometer including elements as those described above and herein. Furthermore, each microbolometer of the FPA may be electrically coupled to the ROIC via contact legs disposed between adjacent microbolometers. The FPA may also further include: a processor coupled to the ROIC for processing image information output from the ROIC, and a display coupled to the processor for displaying the processed image information.

Figure 5:
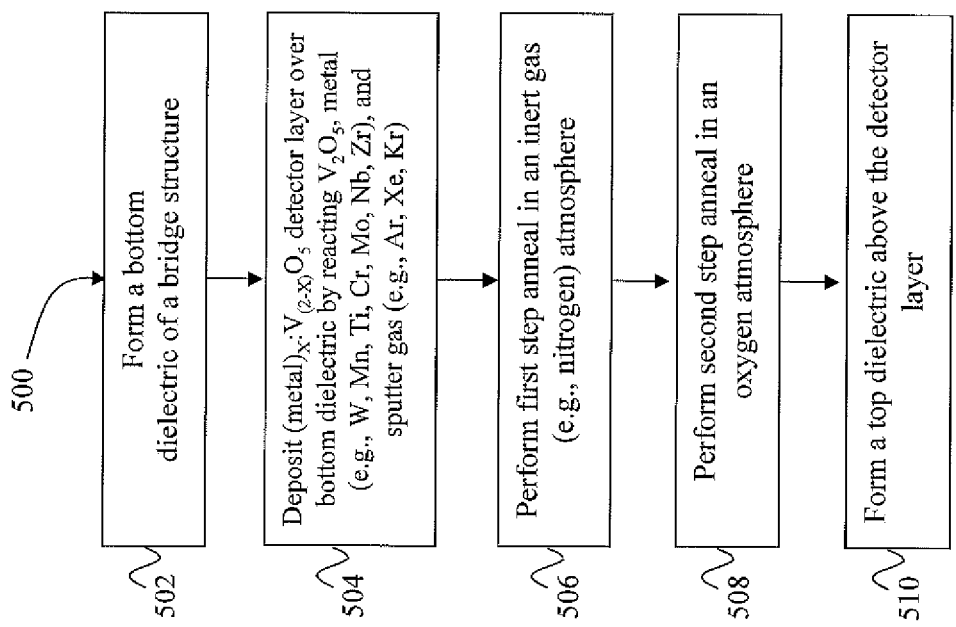
FIG. 5 illustrates a flowchart showing a method of fabricating a microbolometer detector layer in accordance with an embodiment of the present disclosure.

Referring now to FIG. 5, a flowchart shows a method 500 of fabricating a microbolometer in accordance with embodiments of the present disclosure. Method 500 includes forming a bottom dielectric of a bridge structure at block 502, and sputter depositing a detector layer above the bottom dielectric at block 504, the detector layer being comprised of a metal-doped vanadium pentaoxide material. Method 500 further includes performing a first anneal on the deposited metal-doped vanadium pentaoxide material in a nitrogen environment at block 506, performing a second anneal on the first annealed metal-doped vanadium pentaoxide material in an oxygen environment at block 508, and forming a top dielectric above the detector layer at block 510.

It is noted that additional processes may be provided before, during, and after the method 500 of FIG. 5, and that some other processes may only be briefly described herein.

In accordance with one aspect of the present disclosure, each of the bottom dielectric and the top dielectric may be formed to be comprised of a silicon nitride layer, a silicon oxynitride layer, a silicon oxide layer, or a combination thereof.

In accordance with another aspect, the detector layer may be deposited by reacting vanadium pentaoxide, a metal selected from the group consisting of tungsten (W), manganese (Mn), titanium (Ti), Chromium (Cr), molybdenum (Mo), niobium (Nb), and zirconium (Zr), and a sputter gas selected from the group consisting of argon (Ar), xenon (Xe), and krypton (Kr).

In accordance with another aspect, the detector layer may be deposited by reacting vanadium pentaoxide, tungsten, and argon sputter gas to form a $W_xVa_{(2-x)}O_5$ detector layer, wherein x is between about 0.1 and about 0.4. In one embodiment, no oxygen is used during the sputter deposition.

In accordance with another aspect, the detector layer may be deposited to have a thickness between about 600 Å and about 1000 Å, a temperature coefficient of resistance of about 3.4%, and a sheet resistance of about 200 kOhms.

In accordance with another aspect, each of the first anneal and the second anneal may be performed for about 10 minutes at about 375 degrees Celsius. In another example, the first anneal may be performed in a nitrogen-rich environment for about 10 minutes at about 375 degrees Celsius, and the second anneal may be performed in an oxygen-rich environment for about 5 minutes at about 375 degrees Celsius.

In accordance with another aspect, the detector layer may be deposited by radio frequency (RF) sputtering, direct current (DC) pulsed sputtering, or combinations thereof.

In accordance with another aspect, the sputter deposition may be performed at temperatures between about 100 degrees Celsius and about 200 degrees Celsius. In accordance with another aspect, the detector layer may be deposited at temperatures up to about 400 degrees Celsius and/or with an RF bias on the wafer during deposition.

In one example, the detector layer may be deposited within an RF sputtering chamber with an RF sputter power between about 100 watts and about 300 watts at a substrate heater temperature between ambient and about 400 degrees Celsius.

In accordance with yet another aspect, the method may further comprise: electrically coupling the microbolometer to a readout circuit (ROIC) via contact legs; coupling a processor to the ROIC for processing image information output from the ROIC; and coupling a display to the processor for displaying the processed image information.

Figure 6A:
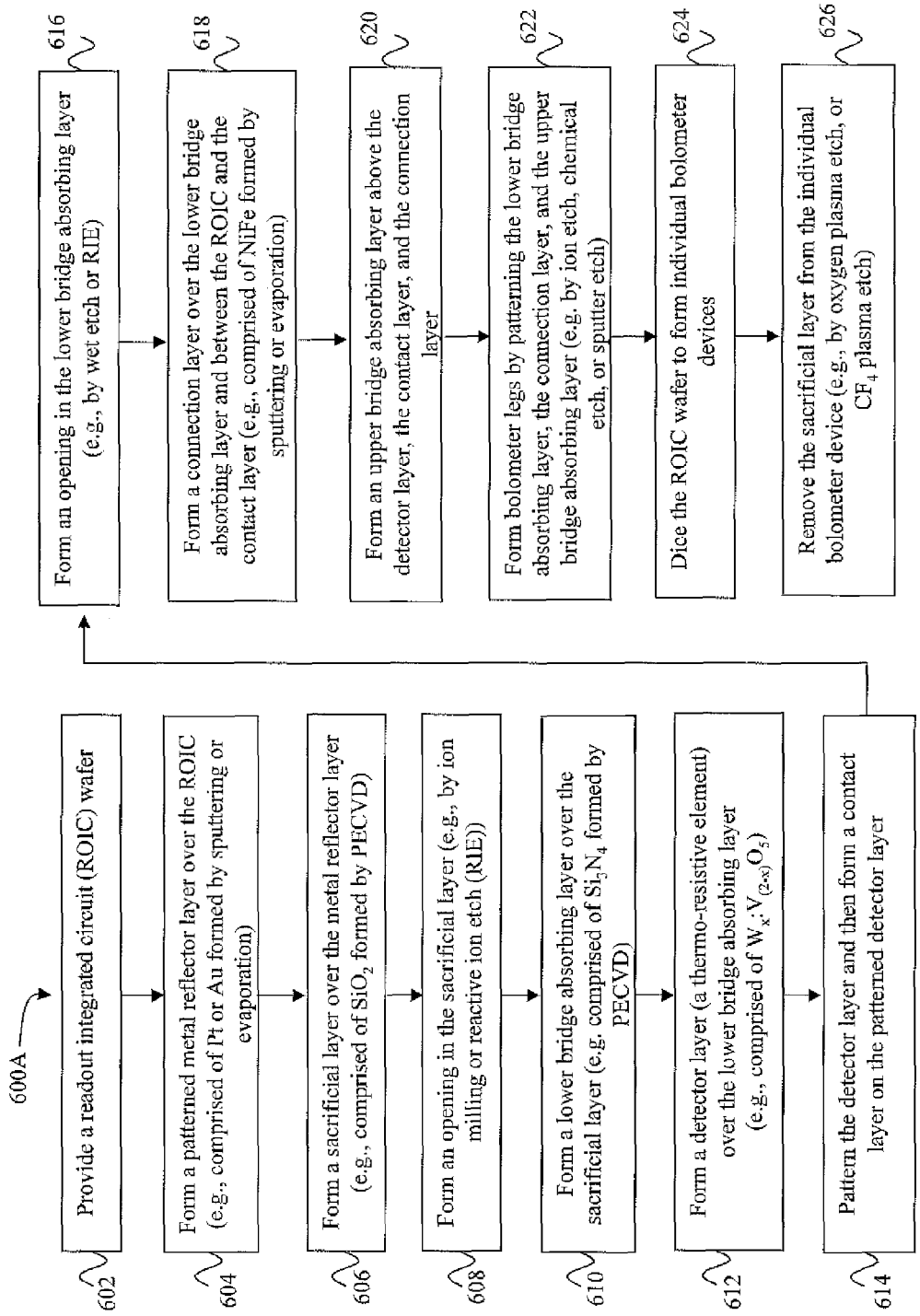
FIGS. 6A-6C illustrate flowcharts showing methods of fabricating a microbolometer with an advantageous detector layer in accordance with embodiments of the present disclosure.
Figure 6B:
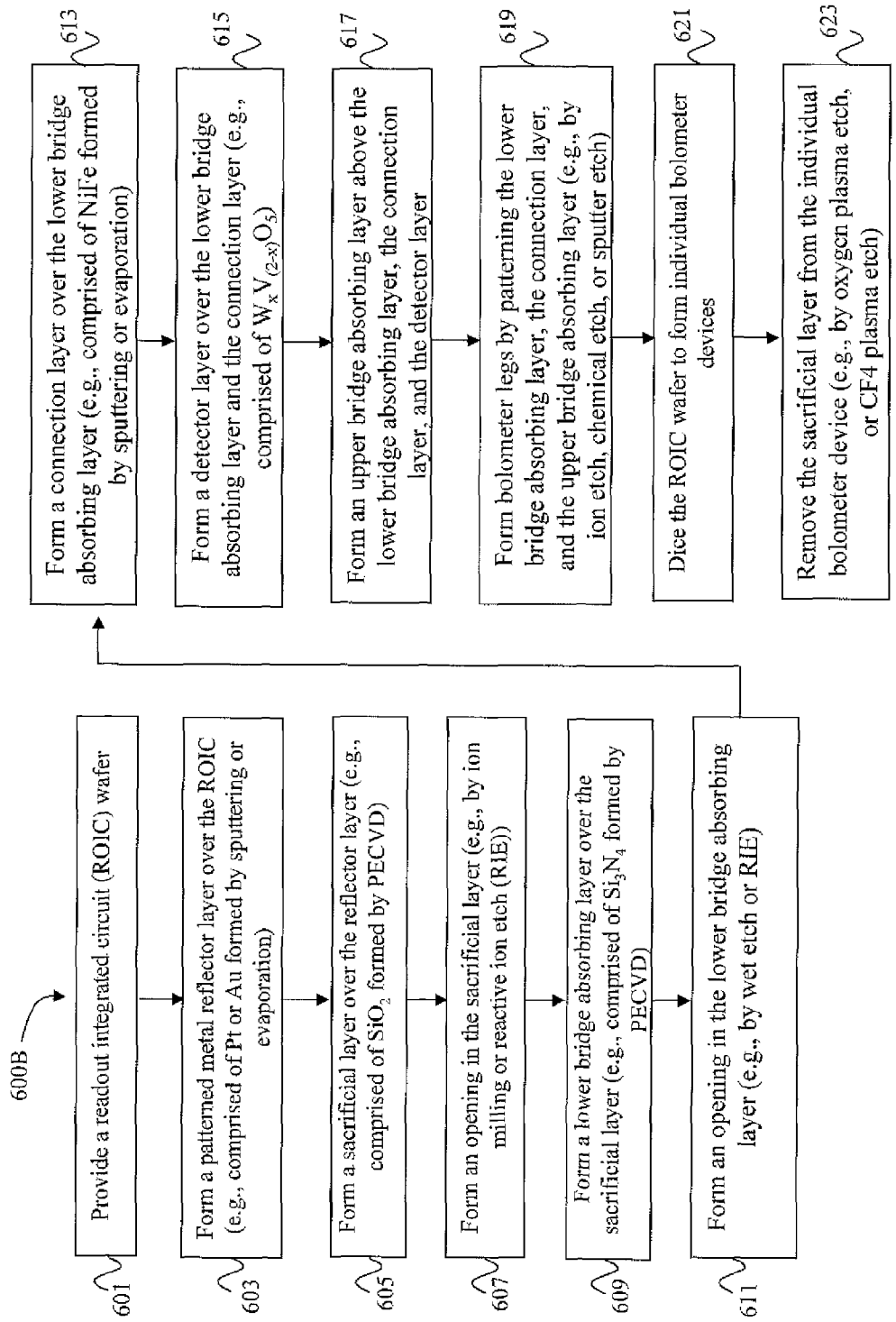
Figure 6C:
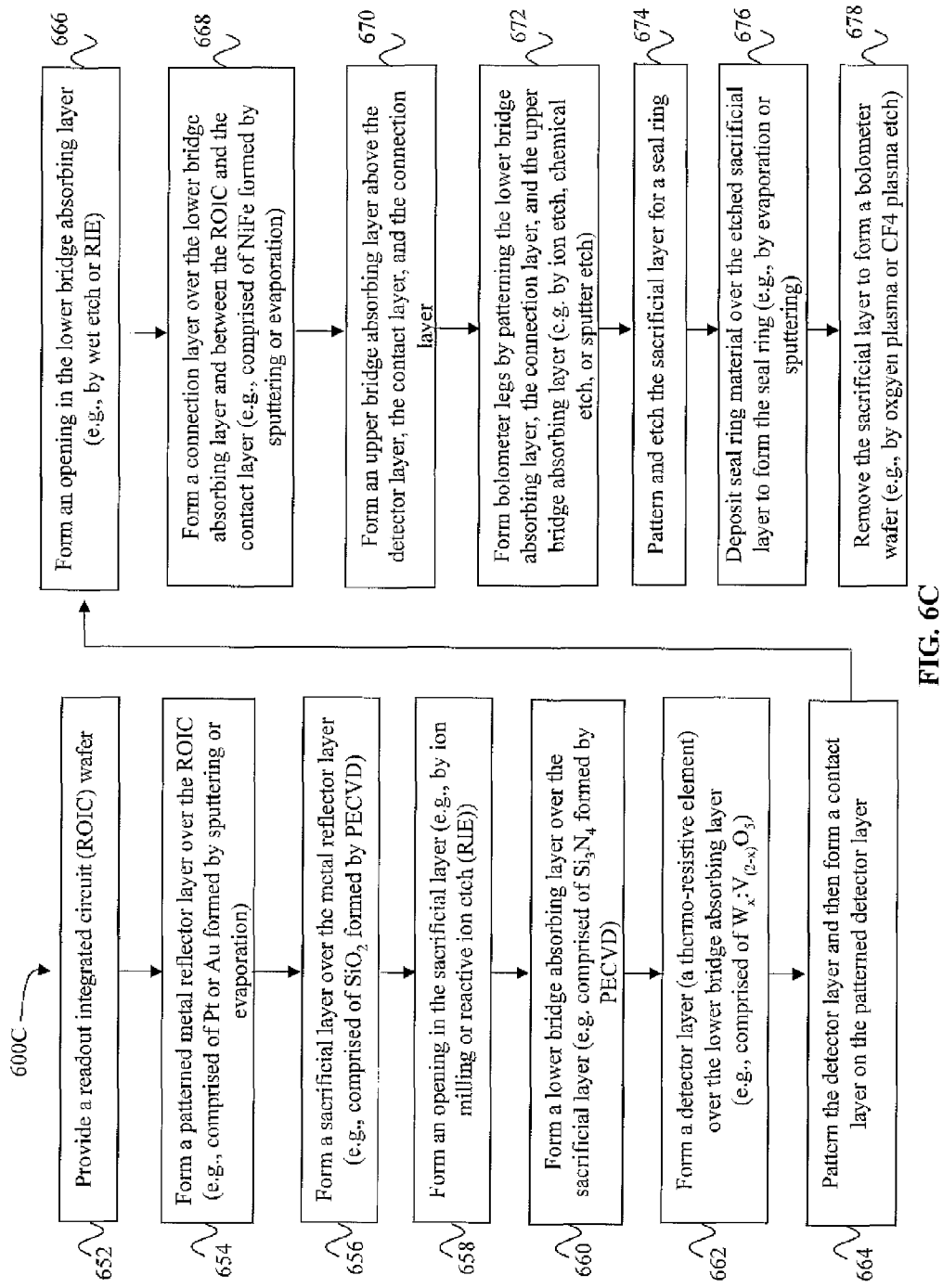

Referring now to FIGS. 6A-6C, flowcharts are shown illustrating methods 600A, 600B, and 600C, respectively, of fabricating a microbolometer with an advantageous detector layer in accordance with embodiments of the present disclosure. FIG. 6A illustrates forming a contact metal after a detector layer liftoff approach, FIG. 6B illustrates forming a contact metal under a detector layer approach in which the detector layer is etched after deposition, and FIG. 6C illustrates forming a bolometer wafer by wafer level packaging (WLP).

Method 600A of FIG. 6A includes providing a readout integrated circuit (ROIC) wafer at block 602, and forming a patterned metal reflector layer over the ROIC at block 604. The metal reflector layer may be comprised of various metals, such as platinum or gold, and may be formed by sputtering or evaporation. The reflector layer may be patterned by various techniques, including photolithography and etch techniques as is known in the art.

Method 600A further includes forming a sacrificial layer over the metal reflector layer at block 606. The sacrificial layer may be comprised of various materials, including but not limited to silicon oxide, and may be formed by suitable techniques, including but not limited to PECVD in one example. Method 600A further includes forming an opening in the sacrificial layer at block 608, for example by ion milling or reactive ion etch (RIE).

Method 600A further includes forming a lower bridge absorbing layer over the sacrificial layer at block 610. The lower bridge absorbing layer may be comprised of various suitable materials, including but not limited to silicon nitride in one example, formed by various suitable techniques, including but not limited to PECVD in one example.

Method 600A further includes forming a detector layer (e.g., a thermo-resistive element) over the lower bridge absorbing layer at block 612. The detector may be comprised of various materials and formed by various techniques as described above and herein. In one example, the detector layer may be comprised of $W_xVa_{(2-x)}O_5$, with x between about 0.1 and about 0.4, formed by sputter deposition of $Va_2O_5$, W, and Ar with a two step post-deposition anneal as described above. Method 600A further includes patterning the detector layer and forming a contact layer on the patterned detector layer at block 614.

Method 600A further includes forming an opening in the lower bridge absorbing layer at block 616, for example by a wet etch or RIE, and then forming a connection layer over the lower bridge absorbing layer and between the ROIC and the contact layer at block 618. The connection layer may be comprised of NiFe in one example, formed by sputtering or evaporation in another example.

Method 600A further includes forming an upper bridge absorbing layer above the detector layer, the contact layer, and the connection layer at block 620, and then forming bolometer legs at block 622 by patterning the lower bridge absorbing layer the connection layer, an the upper bridge absorbing layer. The patterning may be performed by various means and methods, such as by ion etch, chemical etch, or sputter etch.

Method 600A further includes dicing the ROIC wafer to form individual bolometer devices at block 624, and then removing the sacrificial layer from the individual bolometer devices at block 626. The sacrificial layer may be removed by various means and methods, and in one example may include oxygen plasma etch, or $CF_4$ plasma etch.

Method 600B of FIG. 6B also includes providing a readout integrated circuit (ROIC) wafer at block 601, and forming a patterned metal reflector layer over the ROIC at block 603. The metal reflector layer may be comprised of various metals, such as platinum or gold, and may be formed by sputtering or evaporation. The reflector layer may be patterned by various techniques, including photolithography and etch techniques as is known in the art.

Method 600B further includes forming a sacrificial layer over the metal reflector layer at block 605. The sacrificial layer may be comprised of various materials, including but not limited to silicon oxide, and may be formed by suitable techniques, including but not limited to PECVD in one example. Method 600A further includes forming an opening in the sacrificial layer at block 607, for example by ion milling or reactive ion etch (RIE).

Method 600B further includes forming a lower bridge absorbing layer over the sacrificial layer at block 609. The lower bridge absorbing layer may be comprised of various suitable materials, including but not limited to silicon nitride in one example, formed by various suitable techniques, including but not limited to PECVD in one example.

Method 600B further includes forming an opening in the lower bridge absorbing layer at block 611, for example by a wet etch or RIE, and then forming a connection layer over the lower bridge absorbing layer at block 613. The connection layer may be comprised of NiFe in one example, formed by sputtering or evaporation in another example.

Method 600B further includes forming a detector layer (e.g., a thermo-resistive element) over the lower bridge absorbing layer and the connection layer at block 615. The detector layer may be comprised of various materials and formed by various techniques as described above and herein. In one example, the detector layer may be comprised of $W_xVa_{(2-x)}O_5$, with x between about 0.1 and about 0.4, formed by sputter deposition of $Va_2O_5$, W, and Ar with a two step post-deposition anneal as described above.

Method 600B further includes forming an upper bridge absorbing layer above the lower bridge absorbing layer, the connection layer, and the detector layer at block 617, and then forming bolometer legs at block 619 by patterning the lower bridge absorbing layer the connection layer, an the upper bridge absorbing layer. The patterning may be performed by various means and methods, such as by ion etch, chemical etch, or sputter etch.

Method 600B further includes dicing the ROIC wafer to form individual bolometer devices at block 621, and then removing the sacrificial layer from the individual bolometer devices at block 623. The sacrificial layer may be removed by various means and methods, and in one example may include oxygen plasma etch, or $CF_4$ plasma etch.

Method 600C of FIG. 6C includes similar steps as those described above with respect to method 600A of FIG. 6A above and similar descriptions of similar elements and/or steps are fully applicable here although they may not be included to avoid repetitive description. Method 600C also includes providing a readout integrated circuit (ROIC) wafer at block 652, and forming a patterned metal reflector layer over the ROIC at block 654.

Method 600C further includes forming a sacrificial layer over the metal reflector layer at block 656, and forming an opening in the sacrificial layer at block 658.

Method 600C further includes forming a lower bridge absorbing layer over the sacrificial layer at block 660, and forming a detector layer (e.g., a thermo-resistive element) over the lower bridge absorbing layer at block 662. The detector may be comprised of various materials and formed by various techniques as described above and herein. In one example, the detector layer may be comprised of $W_xVa_{(2-x)}O_5$, with x between about 0.1 and about 0.4, formed by sputter deposition of $Va_2O_5$, W, and Ar with a two step post-deposition anneal as described above. Method 600C further includes patterning the detector layer and forming a contact layer on the patterned detector layer at block 664.

Method 600C further includes forming an opening in the lower bridge absorbing layer at block 666, for example by a wet etch or RIE, and then forming a connection layer over the lower bridge absorbing layer and between the ROIC and the contact layer at block 668.

Method 600C further includes forming an upper bridge absorbing layer above the detector layer, the contact layer, and the connection layer at block 670, and then forming bolometer legs at block 672 by patterning the lower bridge absorbing layer the connection layer, an the upper bridge absorbing layer.

Method 600C further includes patterning and etching the sacrificial layer of block 656 for subsequent forming of a seal ring at block 674. Various patterning and etching techniques may be utilized.

Method 600C then includes depositing seal ring material over the patterned and etched sacrificial layer to form the seal ring at block 676. Various seal ring materials, such as metals and dielectrics, may be deposited by various deposition techniques, such as by evaporation or sputtering.

Method 600C then includes removing the sacrificial layer to form a bolometer wafer at block 678. The sacrificial layer may be removed by various means and methods, and in one example may include oxygen plasma etch, or $CF_4$ plasma etch.

It is noted that additional processes may be provided before, during, and after the methods 600A-600C of FIGS. 6A-6C, and that some other processes may only be briefly described herein. Further descriptions of microbolometer processes, circuits, and elements may be found in U.S. Pat. No. Re. 36,706, U.S. Provisional Application No. 61/469,651, and U.S. application Ser. No. 12/844,124, which are incorporated by reference in their entirety herein for all purposes.

Figure 7:
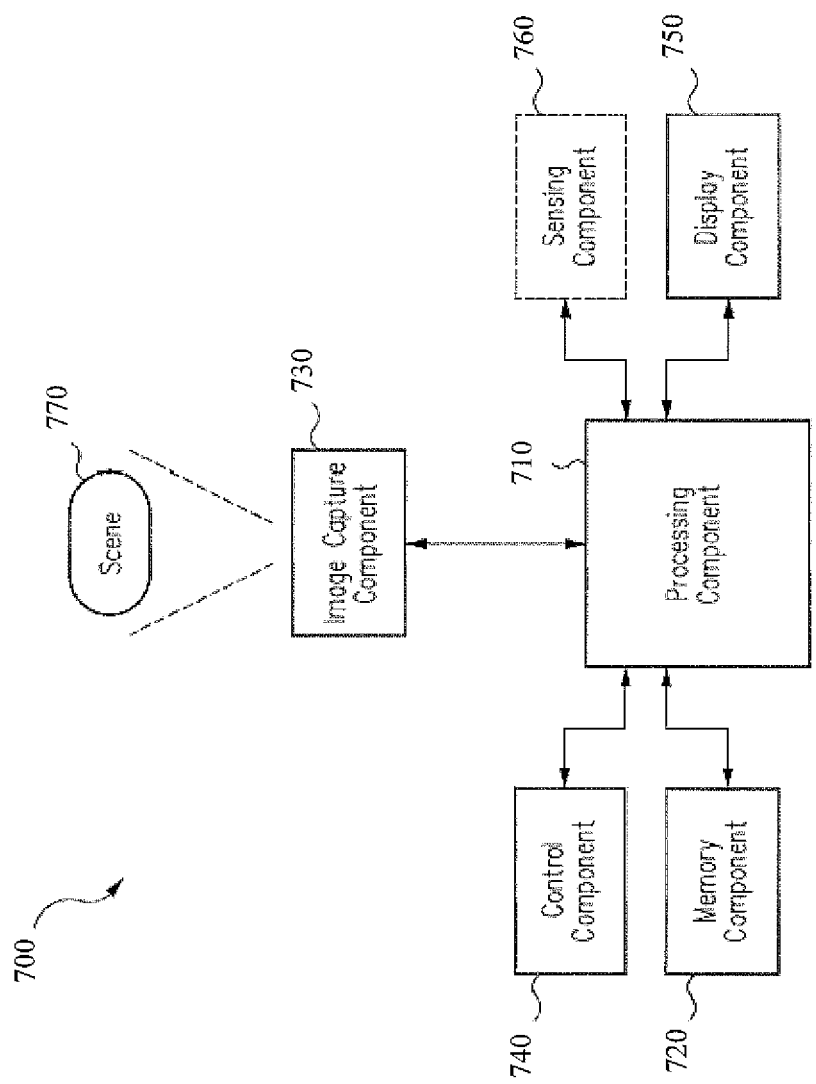
FIG. 7 illustrates a block diagram illustrating a system for capturing images in accordance with an embodiment of the present disclosure.

Referring now to FIG. 7, a block diagram is shown illustrating a system 700 (e.g., an infrared camera) for capturing images and processing in accordance with one or more embodiments. System 700 comprises, in one implementation, a processing component 710, a memory component 720, an image capture component 730, a control component 740, and/or a display component 750. System 700 may further include a sensing component 760.

System 700 may represent for example an infrared imaging device to capture and process images, such as video images of a scene 770. The system 700 may represent any type of infrared camera adapted to detect infrared radiation and provide representative data and information (e.g., infrared image data of a scene) or may represent more generally any type of electro-optical sensor system. In one example, system 700 may represent an infrared camera, a dual band imager such as a night vision imager that operates to sense reflected visible and/or SWIR light for high resolution images and LWIR radiation for thermal imaging, or an imager for sensing both short wave and long wave radiation simultaneously for providing independent image information. System 700 may comprise a portable device and may be incorporated, e.g., into a vehicle (e.g., an automobile or other type of land-based vehicle, an aircraft, a marine craft, or a spacecraft) or a non-mobile installation requiring infrared images to be stored and/or displayed and may comprise a distributed networked system.

In various embodiments, processing component 710 may comprise any type of a processor or a logic device (e.g., a programmable logic device (PLD) configured to perform processing functions). Processing component 710 may be adapted to interface and communicate with components 720, 730, 740, and 750 to perform method and processing steps and/or operations, as described herein, including conventional system processing functions as would be understood by one skilled in the art.

Memory component 720 comprises, in one embodiment, one or more memory devices adapted to store data and information, including for example infrared data and information. Memory device 720 may comprise one or more various types of memory devices including volatile and non-volatile memory devices, and/or a machine-readable medium capable of storing data in a machine-readable format. Processing component 710 may be adapted to execute software stored in memory component 720 so as to perform method and process steps and/or operations described herein.

Image capture component 730 comprises, in one embodiment, any type of image sensor, such as for example one or more infrared sensors (e.g., any type of multi-pixel infrared detector, such as the microbolometer detectors and focal plane arrays as described herein) for capturing infrared image data (e.g., still image data and/or video data) representative of an image, such as scene 770. In one implementation, the infrared sensors of image capture component 730 provide for representing (e.g., converting) the captured image data as digital data (e.g., via an analog-to-digital converter included as part of the infrared sensor or separate from the infrared sensor as part of system 700). In one aspect, the infrared image data (e.g., infrared video data) may comprise non-uniform data (e.g., real image data) of an image, such as scene 770. Processing component 710 may be adapted to process the infrared image data (e.g., to provide processed image data), store the infrared image data in memory component 720, and/or retrieve stored infrared image data from memory component 720. For example, processing component 710 may be adapted to process infrared image data stored in memory component 720 to provide processed image data and information (e.g., captured and/or processed infrared image data).

Control component 740 comprises, in one embodiment, a user input and/or interface device. For example, the user input and/or interface device may represent a rotatable knob (e.g., potentiometer), push buttons, slide bar, keyboard, etc., that is adapted to generate a user input control signal. Processing component 710 may be adapted to sense control input signals from a user via control component 740 and respond to any sensed control input signals received therefrom. Processing component 710 may be adapted to interpret such a control input signal as a parameter value, as generally understood by one skilled in the art.

In one embodiment, control component 740 may comprise a control unit (e.g., a wired or wireless handheld control unit) having push buttons adapted to interface with a user and receive user input control values. In one implementation, the push buttons of the control unit may be used to control various functions of the system 700, such as autofocus, menu enable and selection, field of view, brightness, contrast, noise filtering, high pass filtering, low pass filtering, and/or various other features as understood by one skilled in the art.

Display component 750 comprises, in one embodiment, an image display device (e.g., a liquid crystal display (LCD) or various other types of generally known video displays or monitors). Processing component 710 may be adapted to display image data and information on the display component 750. Processing component 710 may be adapted to retrieve image data and information from memory component 720 and display any retrieved image data and information on display component 750. Display component 750 may comprise display electronics, which may be utilized by processing component 710 to display image data and information (e.g., infrared images). Display component 750 may be adapted to receive image data and information directly from image capture component 730 via the processing component 710, or the image data and information may be transferred from memory component 720 via processing component 710.

Sensing component 760 comprises, in one embodiment, one or more sensors of various types, depending on the application or implementation requirements, as would be understood by one skilled in the art. The sensors of optional sensing component 760 provide data and/or information to at least processing component 710. In one aspect, processing component 710 may be adapted to communicate with sensing component 760 (e.g., by receiving sensor information from sensing component 760) and with image capture component 730 (e.g., by receiving data and information from image capture component 730 and providing and/or receiving command, control, and/or other information to and/or from one or more other components of system 700).

In various implementations, sensing component 760 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. Sensing component 760 may represent conventional sensors as generally known by one skilled in the art for monitoring various conditions (e.g., environmental conditions) that may have an effect (e.g., on the image appearance) on the data provided by image capture component 730.

In some implementations, optional sensing component 760 (e.g., one or more of sensors) may comprise devices that relay information to processing component 710 via wired and/or wireless communication. For example, optional sensing component 760 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of system 700 may be combined and/or implemented or not, as desired or depending on the application or requirements, with system 700 representing various functional blocks of a related system. In one example, processing component 710 may be combined with memory component 720, image capture component 730, display component 750, and/or optional sensing component 760. In another example, processing component 710 may be combined with image capture component 730 with only certain functions of processing component 710 performed by circuitry (e.g., a processor, a microprocessor, a logic device, a microcontroller, etc.) within image capture component 730. Furthermore, various components of system 700 may be remote from each other (e.g., image capture component 730 may comprise a remote sensor with processing component 710, etc. representing a computer that may or may not be in communication with image capture component 730).

In view of the present disclosure, it will be appreciated that apparatus, systems, and methods as set forth herein advantageously may provide microbolometer detectors with increased sensitivity and/or increased manufacturing efficiency, reproducibility, and robustness.

It is understood that this disclosure provides many different embodiments, or examples, for implementing different features of the invention. Specific examples of components and arrangements are described herein to simplify the present disclosure. These are, of course, merely examples and are not intended to be limiting. Moreover, the formation of a first feature over or on a second feature in the description herein may include embodiments in which the first and second features are formed in direct contact, and may also include embodiments in which additional features may be formed interposing the first and second features, such that the first and second features may not be in direct contact. Various features may be arbitrarily drawn in different scales for the sake of simplicity and clarity.

Embodiments described above illustrate but do not limit the disclosure. It should also be understood that numerous modifications and variations are possible in accordance with the principles of the present disclosure. Accordingly, the scope of the disclosure is defined only by the following claims.

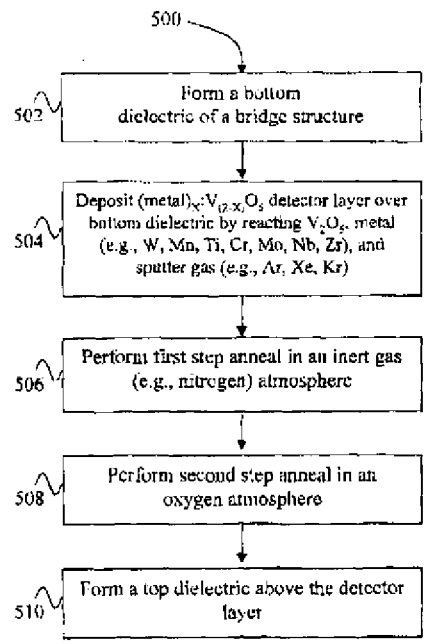

What is claimed as new and desired to be protected is:

1. A microbolometer, comprising:
   a bottom dielectric of a bridge structure;
   a detector layer disposed above the bottom dielectric, the detector layer comprised of a metal-doped vanadium pentaoxide material, and wherein the detector layer has a temperature coefficient of resistance of about 3.4%, and a sheet resistance of about 200 kohms; and
   a top dielectric disposed above the detector layer.

2. The microbolometer of claim 1, wherein each of the bottom dielectric and the top dielectric includes a silicon nitride layer, a silicon oxynitride layer, a silicon oxide layer, or a combination thereof.

3. The microbolometer of claim 1, wherein the detector layer is comprised of a metal selected from the group consisting of tungsten (W), manganese (Mn), titanium (Ti), Chromium (Cr), molybdenum (Mo), niobium (Nb), and zirconium (Zr).

4. The microbolometer of claim 1, wherein the detector layer is comprised of $W_xVa_{(2-x)}O_5$, with x between about 0.1 and about 0.4.

5. The microbolometer of claim 1, wherein the detector layer has a thickness between about 600 Å and about 1000 Å.

6. A focal plane array, comprising:
   a readout circuit (ROIC); and
   a plurality of microbolometers electrically coupled to the ROIC, each microbolometer including:
     a bottom dielectric of a bridge structure;
     a detector layer disposed above the bottom dielectric, the detector layer comprised of a metal-doped vanadium pentaoxide material, and wherein the detector layer is comprised of $W_xVa_{(2-x)}O_5$, with x between about 0.1 and about 0.4; and
     a top dielectric disposed above the detector layer.

7. The focal plane array of claim 6, wherein each microbolometer is electrically coupled to the ROIC via contact legs disposed between adjacent microbolometers.

8. The focal plane array of claim 6, wherein each of the bottom dielectric and the top dielectric includes a silicon nitride layer, a silicon oxynitride layer, a silicon oxide layer, or a combination thereof.

9. The focal plane array of claim 6, wherein the detector layer is further comprised of a metal selected from the group consisting of manganese (Mn), titanium (Ti), Chromium (Cr), molybdenum (Mo), niobium (Nb), and zirconium (Zr).

10. The focal plane array of claim 6, further comprising a processor coupled to the ROIC for processing image information output from the ROIC, and a display coupled to the processor for displaying the processed image information.

11. A method of fabricating a microbolometer, the method comprising:
    forming a bottom dielectric of a bridge structure;
    sputter depositing a detector layer above the bottom dielectric, the detector layer comprised of a metal-doped vanadium pentaoxide material, and wherein the detector layer is deposited by reacting vanadium pentaoxide, tungsten, and argon sputter gas to form a $W_xVa_{(2-x)}O_5$ detector layer, wherein x is between about 0.1 and about 0.4; and
    forming a top dielectric above the detector layer.

12. The method of claim 11, wherein each of the bottom dielectric and the top dielectric are formed to be comprised of a silicon nitride layer, a silicon oxynitride layer, a silicon oxide layer, or a combination thereof.

13. The method of claim 11, wherein
    the detector layer is deposited by reacting vanadium pentaoxide, an additional metal selected from the group consisting of manganese (Mn), titanium (Ti), Chromium (Cr), molybdenum (Mo), niobium (Nb), and zirconium (Zr), and an additional sputter gas selected from the group consisting of xenon (Xe) and krypton (Kr).

14. The method of claim 11, wherein the detector layer is deposited to have a thickness between about 600 Å and about 1000 Å, a temperature coefficient of resistance of about 3.4%, and a sheet resistance of about 200 kohms.

15. The method of claim 11, further comprising:
performing a first anneal on the deposited metal-doped vanadium pentaoxide material in a nitrogen environment; and
performing a second anneal on the first annealed metal-doped vanadium pentaoxide material in an oxygen environment.

16. The method of claim 15, wherein the first anneal is performed for about 10 minutes at about 375 degrees Celsius and the second anneal is performed for about 5 minutes at about 375 degrees Celsius.

17. The method of claim 11, further comprising:
electrically coupling the microbolometer to a readout circuit (ROIC) via contact legs;
coupling a processor to the ROIC for processing image information output from the ROIC; and
coupling a display to the processor for displaying the processed image information.

18. A method of fabricating a microbolometer, the method comprising:
forming a bottom dielectric of a bridge structure;
sputter depositing a detector layer above the bottom dielectric, the detector layer comprised of a metal-doped vanadium pentaoxide material, wherein the detector layer is deposited to have a thickness between about 600 Å and about 1000 Å, a temperature coefficient of resistance of about 3.4%, and a sheet resistance of about 200 kohms; and
forming a top dielectric above the detector layer.

19. The method of claim 18, wherein each of the bottom dielectric and the top dielectric are formed to be comprised of a silicon nitride layer, a silicon oxynitride layer, a silicon oxide layer, or a combination thereof.

20. The method of claim 18, wherein the detector layer is deposited by reacting vanadium pentaoxide, a metal selected from the group consisting of tungsten (W), manganese (Mn), titanium (Ti), Chromium (Cr), molybdenum (Mo), niobium (Nb), and zirconium (Zr), and a sputter gas selected from the group consisting of argon (Ar), xenon (Xe), and krypton (Kr).

21. The method of claim 18, wherein the detector layer is deposited by reacting vanadium pentaoxide, tungsten, and argon sputter gas to form a $W_xVa_{(2-x)}O_5$ detector layer, wherein x is between about 0.1 and about 0.4.

22. The method of claim 18, further comprising:
performing a first anneal on the deposited metal-doped vanadium pentaoxide material in a nitrogen environment; and
performing a second anneal on the first annealed metal-doped vanadium pentaoxide material in an oxygen environment.

23. The method of claim 22, wherein the first anneal is performed for about 10 minutes at about 375 degrees Celsius and the second anneal is performed for about 5 minutes at about 375 degrees Celsius.

* * * * *

UNITED STATES PATENT AND TRADEMARK OFFICE
CERTIFICATE OF CORRECTION

PATENT NO. : 8,502,147 B2
APPLICATION NO. : 13/252948
DATED : August 6, 2013
INVENTOR(S) : Yaroslava Petraitis et al.

It is certified that error appears in the above-identified patent and that said Letters Patent is hereby corrected as shown below:

Delete the title page and substitute therefore with the attached title page showing the corrected number of claims in patent.

In the Claims:

Column 14, Line 31, insert Claim 24

-- 24. The method of claim 21, further comprising:
    electrically coupling the microbolometer to a readout circuit (ROIC) via contact legs;
    coupling a processor to the ROIC for processing image information output from the ROIC;
    and coupling a display to the processor for displaying the processed image information. --

Signed and Sealed this
Twenty-second Day of July, 2014

Michelle K. Lee
*Deputy Director of the United States Patent and Trademark Office*

(12) United States Patent
Petraitis et al.

(10) Patent No.: US 8,502,147 B2
(45) Date of Patent: Aug. 6, 2013

(54) MICROBOLOMETER DETECTOR LAYER

(75) Inventors: Yaroslava Petraitis, Ventura, CA (US); Richard E. Bornfreund, Santa Barbara, CA (US); Joseph H. Durham, Santa Barbara, CA (US); Robert F. Cannata, Santa Barbara, CA (US)

(73) Assignee: Flir Systems, Inc., Wilsonville, OR (US)

( * ) Notice: Subject to any disclaimer, the term of this patent is extended or adjusted under 35 U.S.C. 154(b) by 23 days.

(21) Appl. No.: 13/252,948

(22) Filed: Oct. 4, 2011

(65) Prior Publication Data
US 2013/0082178 A1 Apr. 4, 2013

(51) Int. Cl.
*H01J 25/00* (2006.01)

(52) U.S. Cl.
USPC ............................................. 250/332

(58) Field of Classification Search
USPC .............. 250/330–335, 336.1–336.2, 337, 250/338.1, 338.5, 339.1, 339.15, 340, 341.1–341.9, 250/342–353
See application file for complete search history.

(56) References Cited

U.S. PATENT DOCUMENTS

| | | | |
|---|---|---|---|
| 3,484,611 A * | 12/1969 | Hisao | 250/351 |
| 5,021,663 A * | 6/1991 | Hornbeck | 250/349 |
| 5,801,383 A | 9/1998 | Wada et al. | |
| 6,028,309 A | 2/2000 | Parrish et al. | |
| RE36,706 E | 5/2000 | Cole | |
| 6,222,454 B1 * | 4/2001 | Harling et al. | 340/584 |
| 6,489,613 B1 | 12/2002 | Mori et al. | |
| 7,250,604 B2 | 7/2007 | Moon et al. | |
| 7,915,585 B2 * | 3/2011 | Geneczko | 250/338.1 |
| 2007/0120058 A1 * | 5/2007 | Blackwell et al. | 250/338.1 |

FOREIGN PATENT DOCUMENTS

| | | |
|---|---|---|
| EP | 0156008 | 10/1985 |
| EP | 1122526 | 8/2001 |
| JP | 8128889 | 5/1996 |
| JP | 9257565 | 10/1997 |
| KR | 20050077899 | 8/2005 |

OTHER PUBLICATIONS

Gouda et al., "Structural and electrical properties of mixed oxides of manganese and vanadium: A new semiconductor oxide thermister material," 2009. Sensors and Actuators A, vol. 155, pp. 263-271.*
Nam et al., Structural and electrical properties of vanadium tungsten oxide thin films Grown on Pt/TiO$_2$/SiO$_2$/Si substrates, Journal of Ceramic Processing Research, vol. 10, No. 2, 2009, pp. 224-226.
Nam et al., Structural and Electrical Properties of Vanadium Tungsten Oxide Thin films, The International Conference on Electrical Engineering, 2009, pp. 1-4.

(Continued)

*Primary Examiner* — Kiho Kim
(74) *Attorney, Agent, or Firm* — Haynes and Boone, LLP

(57) ABSTRACT

A microbolometer is disclosed, including a bottom dielectric of a bridge structure; a detector layer disposed above the bottom dielectric, the detector layer comprised of a metal-doped vanadium pentaoxide material; and a top dielectric disposed above the detector layer.

24 Claims, 11 Drawing Sheets